United States Patent
Berghus et al.

[11] Patent Number: 5,228,665
[45] Date of Patent: Jul. 20, 1993

[54] LEAF-SPRING ASSEMBLIES

[75] Inventors: Jürgen Berghus; Hartmut Beuss, both of Stuttgart; Edgar Häfele, Aichwald; Siegfried Zittel, Esslingen, all of Fed. Rep. of Germany

[73] Assignee: Mercedes-Benz AG, Fed. Rep. of Germany

[21] Appl. No.: 846,863

[22] Filed: Mar. 6, 1992

[30] Foreign Application Priority Data

Mar. 6, 1991 [DE] Fed. Rep. of Germany ....... 4107186

[51] Int. Cl.⁵ .............................................. B60G 11/10
[52] U.S. Cl. .................................... 267/262; 267/260; 280/718
[58] Field of Search ..................... 267/36.1, 44, 47, 48, 267/260, 262, 269; 280/718

[56] References Cited

U.S. PATENT DOCUMENTS 3,841,655 10/1974 Schaeff ............................ 280/718
4,004,826 1/1977 Subhedar ........................... 267/260

FOREIGN PATENT DOCUMENTS

| 176131 | 9/1953 | Austria . |
| 2038164 | 2/1971 | Fed. Rep. of Germany . |
| 2349381 | 4/1974 | Fed. Rep. of Germany . |
| 2421115 | 11/1975 | Fed. Rep. of Germany . |
| 0000334 | 1/1991 | Japan . |
| 1406651 | 9/1975 | United Kingdom . |
| 2192689 | 1/1988 | United Kingdom . |

Primary Examiner—Robert J. Oberleitner
Assistant Examiner—Chris Schwartz
Attorney, Agent, or Firm—Evenson, McKeown, Edwards & Lenahan

[57] ABSTRACT

A leaf spring assembly comprised of at least three leaf springs, at least one of the leaf springs having a rolled over portion for the spring eyes and wherein the leaf springs are prevented from lateral shifting or splaying by rib guides and grooves formed in intermediate and supporting springs and lying in the end area of a main spring.

10 Claims, 2 Drawing Sheets

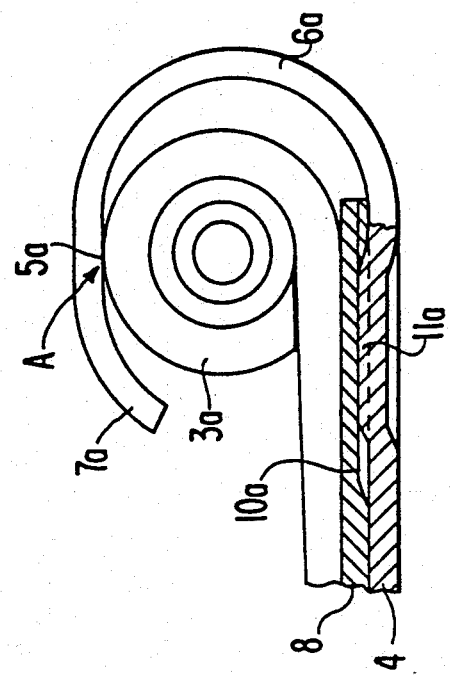
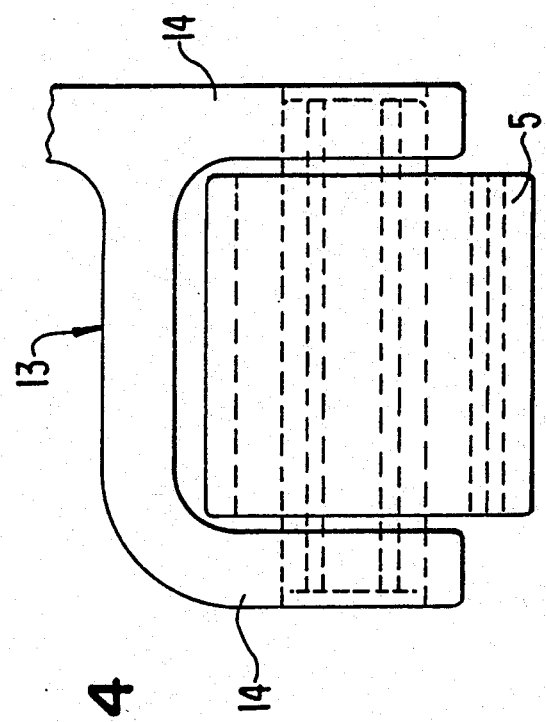
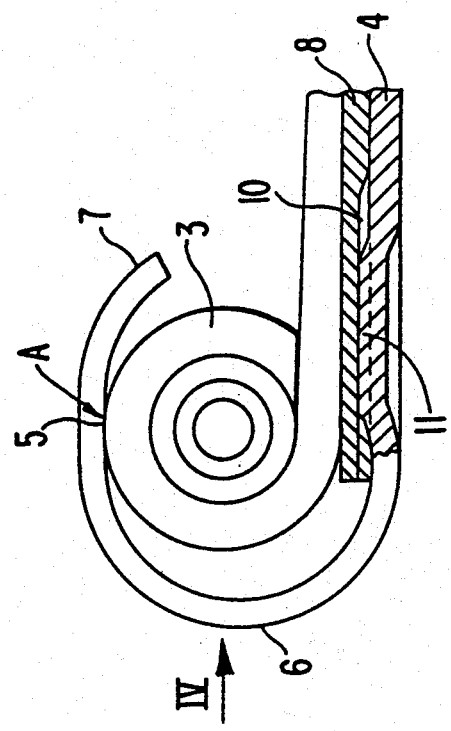

LEAF-SPRING ASSEMBLIES

BACKGROUND AND SUMMARY OF THE INVENTION

The invention relates to leaf-spring assemblies for automobile suspension systems and the like.

German Patent Document 2,349,381 discloses known leaf-spring assemblies consisting of a main spring leaf having integrally formed spring eyes and a supporting spring leaf reaching beneath this main spring leaf. The two spring leaves are connected in their center area by a center bolt and are protected close to their end against expanding in the vertical direction (fanning-out) in particular by spring clips. In addition, the supporting spring leaf has a rolled-over portion overlapping the eye of the main spring leaf in order to maintain the guidance of the axle via the leaf-spring assembly in the event of the main spring leaf fracturing. Furthermore, in the known construction, a rib guide extending in the longitudinal direction of the spring is provided between the main spring leaf and the supporting spring leaf in the end area of the spring, and in fact approximately in the overlap area relative to the spring eye, which rib guide serves as protection against lateral shifting (splaying) of the spring leaves of the spring assembly. The rib guide is formed by the additional spring leaf being designed to be narrower than the main spring leaf and by the main spring leaf being provided with rib guides in the area projecting laterally beyond the additional spring leaf, between which rib guides the supporting spring leaf lies. The distance between the rolled-over portion and the spring eye of the main spring leaf is selected in such a way that assembly of the spring leaves is possible in the relieved state and said distance is thereby also large enough to virtually eliminate contact between the rolled-over portion and the spring eye.

In this known construction, as in similar further embodiments having protection against splaying by rib guides running in the longitudinal direction of the spring (Austrian Patent 176,131), spring clips, as already mentioned, are used, which means additional expenditure.

An object of the invention is to design a leaf-spring assembly of the said type having more than two leaf springs in such a way that spring clips can be dispensed with.

This object is achieved according to certain preferred embodiments of the invention in a leaf-spring assembly wherein at least one intermediate spring leaf lies between a main spring leaf and a supporting spring leaf such that the main spring leaf, the intermediate spring leaf and the supporting spring leaf are held together in the vertical direction via the supporting spring leaf, and the intermediate spring leaf and supporting spring leaf are protected against splaying by a rib guide, and wherein, in the vertical extent of the rib guide, the clearance of movement between the spring eye of the main spring leaf and the rolled-over portion of the supporting spring leaf in the direction of vertical or protruding height of the rib guide is less than the overlap height of the rib guide with respect to the adjacent intermediate spring leaf.

In a leaf-spring assembly constructed in this way, the main spring leaf, the intermediate spring leaf and the supporting spring leaf have roughly the same length, and furthermore protection against splaying is provided by rib guides between intermediate spring leaf and supporting spring leaf, and the requisite safeguard against fanning-out, which at the same time would permit splaying, is obtained owing to the fact that the rolled-over portion of the supporting spring leaf has clearance in the vertical direction relative to the spring eye, which clearance is less than the guide height of the rib guides. In this construction, therefore, the intermediate spring leaves are also essentially fixed in the vertical direction relative to the main spring leaf by the supporting spring leaf.

The requisite longitudinal displaceability between the individual spring leaves of the assembly as well as frictional relationships which are favorable even under difficult conditions are ensured by the guide ribs being lower in their height than the depth of the location grooves, which in addition are also longer than the guide ribs.

Other objects, advantages and novel features of the present invention will become apparent from the following detailed description of the invention when considered in conjunction with the accompanying drawings.

BRIEF DESCRIPTION OF THE DRAWINGS

FIG. 3 shows an enlarged representation of the spring according to FIG. 1 in the area of a spring eye, in particular a front spring eye, having a rolled-over portion;

FIG. 3a shows an enlarged representation of the spring according to FIG. 1 in the area of a spring eye, in particular a rear spring eye, having a roll-over portion; and FIG. 4 shows a view of the leaf-spring assembly according to FIG. 1 in the direction of arrow IV and of the spring carrier allocated to this spring end.

DETAILED DESCRIPTION OF THE DRAWINGS

Figure 1:
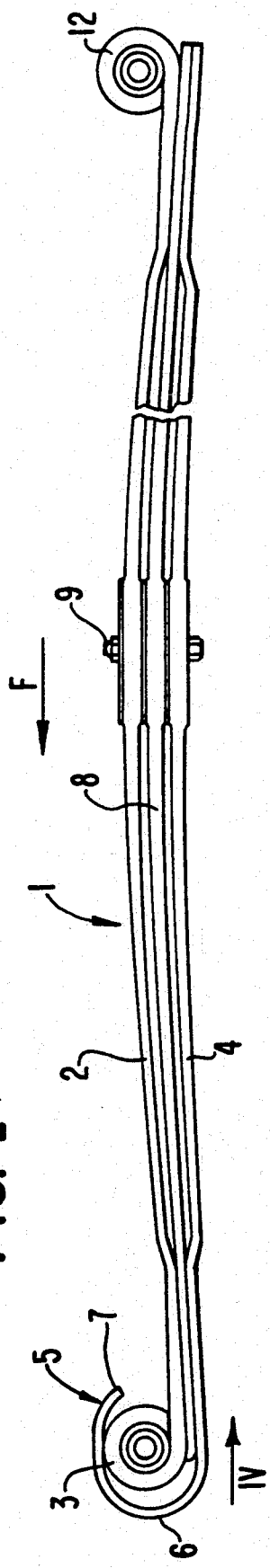
FIG. 1 shows a side view of a leaf-spring assembly, especially for vehicles, constructed according to a preferred embodiment of the invention.

The leaf-spring assembly shown in the figures is designated overall by 1 and, apart from a main spring leaf 2 having a spring eye 3 integrally formed on one end, comprises a supporting spring leaf 4. The supporting spring leaf 4 extends over the length of the main spring leaf and, in the exemplary embodiment shown, runs out in a rolled-over portion 5 at its front end relative to the travelling direction F. The rolled-over portion 5 is formed by a bow-shaped part of the supporting spring leaf 4 and consists of a U-shaped curve 6 which extends at a distance from the spring eye 3 and one leg of which runs into the supporting spring leaf and the other leg of which, overlapping the spring eye on the opposite side, runs out in a section 7 folded down over the spring eye at a distance behind the same. The distance between the two legs of the U-shaped curve 6 essentially forming the rolled-over portion is on the one hand determined by the thickness of an intermediate spring leaf 8 which likewise extends over the length of the main spring leaf 2 and via which the supporting spring leaf 4 is supported against the main spring leaf 2 in the area of the spring eye 3. On the other hand, the leg of the U-shaped curve 6 of the rolled-over portion 5, which leg runs into the section 7, is selected to be at such a distance A that there is a slight clearance of movement between the spring eye 3 and this leg of the curve 6, this clearance merely being large enough to ensure at least essentially frictionless mobility between this leg and the spring eye 3 under normal conditions.

The main spring leaf 2, the intermediate spring leaf 8 and the supporting spring leaf 4 are restrained relative to one another in a known manner via a center bolt 9 in the center longitudinal are of the leaf-spring assembly, in which center longitudinal area the attachment to the axle (not shown here) is made. The springs 2, 4, 8 extend spaced from and adjacent one another over essentially the same length between the center area and the end areas. The supporting spring leaf 4 and the intermediate spring leaf 8 each end essentially below the spring eye 3 of the main spring leaf 2 so that the intermediate spring leaf 8 and the supporting spring leaf 4 support the main spring leaf 2 over the entire length.

In the exemplary embodiment shown, apart from the connection between the spring leaves in the longitudinal center area via the center bolt 9, no special connecting elements are provided for the springs forming the leaf-spring assembly 1. It is also possible, unlike the exemplary embodiment shown in FIG. 1, for more than one intermediate spring leaf to be provided in a further development of the invention as shown in FIG. 1a wherein another intermediate leaf-spring 8a has been included.

Figure 1A:
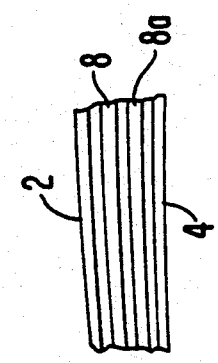
FIG. 1a shows a side view of a leaf-spring assembly constructed according to another preferred embodiment of the invention.
Figure 2:
FIG. 2 shows a plan view of the leaf-spring assembly according to FIG. 1.

FIG. 2 illustrates this construction in combination with FIG. 1, FIG. 2 also showing that the springs forming the leaf-spring assembly preferably have the same width within the scope of the invention. When used in vehicles, especially for the guidance of vehicle axles, leaf-spring assemblies are not only subjected to vertical loads which impose a bending stress on the leaf-spring assemblies but also have to absorb longitudinal and transverse forces. Longitudinal forces, in particular under the effect of brake forces, lead to an S-shaped deformation of the spring as viewed over the length of the spring, the so-called S-shock. Transverse forces, as a result of transverse loads, arise when negotiating curves.

The longitudinal forces (brake forces) tend to cause the spring assembly 1 to fan out towards the bottom in the front spring part relative to the travelling direction F (assuming that the axle is arranged below the spring). The transverse forces tend to result in lateral splaying of individual springs of the spring assembly. Both the fanning-out and the splaying are undesirable as phenomena impairing the guiding and supporting function of the spring and these tendencies are countered by appropriate guide measures which are explained in more detail with reference to the exemplary embodiment according to FIG. 3.

In a partial section through the longitudinal center showing a detail of the supporting spring leaf 4 and the intermediate spring leaf 8, FIG. 3 shows that the intermediate spring leaf 8, on its underside in the area running out below the spring eye 3, has a location groove 10 corresponding to a guide rib 11 formed at the top of the supporting spring leaf 4. The height of the guide rib 11 is slightly less than the depth of the location groove 10 and greater than the clearance of movement A which is permitted in the vertical direction in the transverse center plane of the spring eye by the distance between the rolled-over portion 5 and the spring eye 3. In this way, the supporting spring leaf 4 and the intermediate spring leaf 8 are fixed relative to one another in the transverse direction and therefore cannot become splayed. Fanning-out is also eliminated by the narrow clearance of movement between the rolled-over portion 5 relative to the spring eye 3. Here, the length of the location groove 10 is greater than the length of the guide rib 11 so that the longitudinal displaceability of the individual spring leaves of the leaf-spring assembly relative to one another is not impaired.

On the basis of the loading conditions assumed, fanning-out need not be feared at the rear end of the leaf-spring assembly, and a rolled-over portion for the spring eye (designated by 12), formed by the end of the supporting spring leaf 4, can be dispensed with at this location. Under other loading conditions (arrangement of the axle above the spring), the arrangement of the rolled-over portion and the longitudinal ribbing between supporting spring leaf and intermediate spring leaf can be provided at the rear spring end. Irrespective thereof, in order to improve the transverse guidance properties and thus to prevent the splaying, a rib guide having a mutual overlap against lateral shifting (splaying) can also be used at this spring end, as shown in FIG. 3a wherein elements 3a, 5a, 6a, 7a, 10a and 11a correspond to elements 3, 5, 6, 7, 10 and 11, respectively.

To prevent the splaying, it is adequate within the scope of the invention to merely secure the supporting spring leaf and the intermediate spring leaf or leaves to one another in the area of the front spring end by an appropriate rib guide formed by a location groove and a guide rib. This prevents the main spring leaf from being impaired in its supporting behavior in its highly loaded area adjacent to the spring leaf by the deformation measures resulting from a rib guide of this type. In addition, however, it can be advantageous, according to the arrangement of FIG. 4, to mount the rolled-over end of the leaf spring via a U-shaped spring carrier 13 whose legs 14 extend laterally over the rolled-over portion 5 and have only a small clearance relative to the overlapped side area of the spring assembly and thereby limit lateral shifting of the supporting spring 4 in the area of the rolled-over portion 5 relative to the spring eye 3.

For manufacturing reasons, a curved profile proves to be convenient for the location groove 10, and accordingly a circular-arc-shaped profile arched in cross-section is also preferably obtained for the guide rib, the height of which is smaller and preferably about half as large as the radius of the circular arc. In the exemplary embodiment, the height of the guide rib 11 is about 3.5 mm, the depth of the location groove 10 is about 4 mm, and the radius of the circular arc is about 7 mm for the guide rib 11 and about 8 mm for the location groove 10.

The length of the guide rib corresponds to a fraction of its height and is predetermined at 50 mm in the exemplary embodiment.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:
1. Leaf-spring assembly, comprising:
    a main spring leaf having an integrally formed spring eye;

a supporting spring leaf which is beneath said main spring leaf, is approximately the same length and has at one end a rolled-over portion overlapping the eye of said main spring leaf, wherein said spring leaves are protected against expanding or fanning out in the vertical direction by limiting vertical space between said rolled-over portion and said eye and are protected against lateral shifting or splaying by a rib guide extending in the longitudinal direction of said spring assembly, lying in an end area of said main spring; and at least one intermediate spring leaf between said main spring leaf and said supporting spring leaf, wherein said main spring leaf, said intermediate spring leaf and said supporting spring leaf are held together in the vertical direction via said supporting spring leaf, and wherein said intermediate spring leaf and said supporting spring leaf are protected against splaying by said rib guide, and wherein, in the vertical direction of said rib guide, having a clearance of movement between the spring eye of said main spring leaf and said rolled-over portion of said supporting spring leaf which is less than overlap height of said rib guide, wherein the rib guide includes a guide rib in one of the intermediate spring leaf and the supporting spring leaf and a location groove in the other of the intermediate spring leaf and the supporting spring, the guide rib and location groove having mutual overlap.

2. Leaf-spring assembly according to claim 1, wherein the height of said guide rib is less than the depth of said location groove.

3. Leaf-spring assembly according to claim 2, wherein the length of said location groove is greater than the length of said guide rib.

4. Leaf-spring assembly according to claim 1, wherein said location groove is in said intermediate spring leaf and extends towards an end of said intermediate spring leaf.

5. Leaf-spring assembly according to claim 1, wherein the length of said guide rib corresponds to a fraction of its height.

6. Leaf-spring assembly according to claim 1, wherein the rolled-over portion of said supporting spring leaf reaches around said spring eye of said main spring leaf in the area of one spring end, in particular a front spring end, wherein said supporting spring leaf and said intermediate spring leaf are connected by the rib guide, and wherein all springs of the leaf-spring assembly are connected via a rib guide in the area of a rear spring end in which said supporting spring leaf runs out freely together with said intermediate spring leaf.

7. Leaf-spring assembly according to claim 1, wherein said main spring leaf, said intermediate spring leaf and said supporting spring leaf extend at a spacing from one another in a section between the respective end area and the center supporting area of the leaf-spring assembly.

8. Leaf-spring assembly according to claim 1, wherein the leaf-spring assembly has only one intermediate spring leaf.

9. Leaf-spring assembly according to claim 1, wherein the leaf-spring assembly has a plurality of intermediate spring leaves.

10. Leaf-spring assembly according to claim 1, wherein said rolled-over portion lies between the legs of a U-shaped spring carrier which form lateral stops for the spring leaves.

* * * * *